United States Patent [19]

Mauthe

[11] 4,391,662
[45] Jul. 5, 1983

[54] METHOD OF AND MEANS FOR PROVIDING AN EFFECTIVE THERMOPLASTIC ADHESIVE CONNECTION OR SEAL USING THERMOCHROME DYE

[75] Inventor: Peter Mauthe, Neu-Ulm, Fed. Rep. of Germany

[73] Assignee: Hilti Aktiengesellschaft, Schaan, Liechtenstein

[21] Appl. No.: 328,507

[22] Filed: Dec. 8, 1981

[30] Foreign Application Priority Data

Dec. 17, 1980 [DE] Fed. Rep. of Germany ....... 3047635

[51] Int. Cl.³ ...................... G01N 31/22; G01K 11/12
[52] U.S. Cl. .................................. 156/64; 73/150 R; 116/200; 116/201; 116/207; 116/DIG. 41; 229/83; 252/962; 428/913; 524/536; 524/849; 524/871; 524/878
[58] Field of Search ................ 8/488; 73/150 R, 356; 116/200, 201, 207, DIG. 41; 156/64, DIG. 21; 229/83; 252/408; 428/913; 524/849, 871, 878, 536

[56] References Cited

U.S. PATENT DOCUMENTS

| 2,032,386 | 3/1936 | Wood ................... 229/83 X |
| 3,471,422 | 10/1969 | Edlein et al. ............ 252/408 |
| 3,740,290 | 6/1973 | Kelsey et al. .......... 156/64 X |
| 3,989,569 | 11/1976 | Newman ............... 156/234 |
| 4,105,583 | 8/1978 | Glover et al. ........... 252/408 |
| 4,188,437 | 2/1980 | Rohowetz ............ 73/356 X |
| 4,189,942 | 2/1980 | Giezen et al. ............ 73/356 |
| 4,297,160 | 10/1981 | Kusayama et al. ....... 156/64 X |

FOREIGN PATENT DOCUMENTS

2515474 10/1975 Fed. Rep. of Germany .

*Primary Examiner*—Robert A. Dawson
*Attorney, Agent, or Firm*—Toren, McGeady and Stanger

[57] ABSTRACT

In providing an adhesive connection or a seal using a thermoplastic adhesive for securing materials together, a thermochrome dye is added to the thermoplastic adhesive so that it provides a color change in the temperature range between the temperature where a satisfactory moistening effect is achieved and the temperature where the satisfactory moistening effect is no longer present.

10 Claims, No Drawings

4,391,662

METHOD OF AND MEANS FOR PROVIDING AN EFFECTIVE THERMOPLASTIC ADHESIVE CONNECTION OR SEAL USING THERMOCHROME DYE

SUMMARY OF THE INVENTION

The present invention is directed to a method of making an adhesive connection or seal using a thermoplastic adhesive, and also to the thermoplastic adhesive used for performing the method.

Due to the development of synthetic adhesives following the discovery of the polymerization process in the 1920's, adhesion techniques previously limited to the use of animal and vegetable adhesives have experienced an unusual boom. Thermoplastic adhesives are a special group within the class of synthetic adhesives because they have the advantage of being free of solvents and dispersing agents. Thermoplastic adhesives are used increasingly in a number of industries, such as in the automobile, furniture, shoe, packaging, aircraft and construction industries, replacing the conventional joining methods such as welding, riveting and making connections by means of screws, nails and the like.

To afford a good adhesive connection, it is first necessary to assure that the solid material is moistened with the adhesive as completely as possible. Accordingly, the adhesive must be in a liquid form or, more precisely, it must have a low viscosity. The sufficiently low viscosity required for satisfactory moistening is achieved in thermoplastic adhesives by heating and converting the material to a melt having at least the required minimum viscosity. In the moistened region between the material and the thermoplastic adhesive the desired adhesive connection occurs during cooling and, due to the decrease in temperature, the cohesive forces in the thermoplastic adhesive reach the desired level.

Therefore, the important prerequisite for a good adhesive connection is the conversion of the thermoplastic adhesive into a melt of such a low viscosity that a complete moistening of the adhesion area is guaranteed.

Usually thermoplastic adhesives are processd for application using so-called glue guns. In addition to a dispensing mechanism, these glue guns also contain a heating zone in which the thermoplastic material, usually in the solid state in a rod shape, is heated to temperatures corresponding to a viscosity of the melt at which a satisfactory moistening effect is possible. With the satisfactory moistening effect it should be possible to achieve an effective adhesive connection. This does not take into consideration, however, that depending on the air temperature at the processing location, the temperature of the materials to be connected with the adhesive, the heat capacity and similar factors of the materials, while the adhesive may emerge from the glue gun at the desired temperature, due to a decrease in temperature at the processing location it may not be possible to assure a satisfactory moistening effect. A particular disadvantage is that the person applying the adhesive is usually unaware that there is an unsatisfactory moistening with a resultant ineffective adhesive connection.

Therefore, it is the primary object of the present invention to provide a method of applying the thermoplastic adhesive where the operator is able to determine visually whether a satisfactory moistening effect is achieved so that an effective adhesive connection or seal is possible. By visual observation the operator is able to determine when the desired satisfactory moistening conditions do not yet exist or no longer exist.

In accordance with the present invention, a method of making an adhesive connection or seal using thermoplastic adhesives is provided where for at least a short time, it can be observed whether at least the minimum temperature for satisfactory moistening of the material to be connected or sealed is present or where the temperature of the thermoplastic material has fallen below a temperature where it is no longer possible to achieve an effective adhesive connection or seal.

In accordance with the invention, the thermoplastic adhesive includes at least one thermochrome dye which displays a change in color in the temperature range between the temperature where a satisfactory moistening effect is present to the temperature where it is no longer possible to assure the presence of such a satisfactory moistening effect. Preferably, such thermochrome dyes are used which provide a change in color at a temperature somewhat above the temperature at which the satisfactory moistening effect is no longer assured, that is, a change in color at a temperature somewhat above the minimum temperature affording the satisfactory moistening effect.

Using the method of the present invention, it is possible to provide the person applying the adhesive material with a visual indication that the desired satisfactory moistening characteristic is present or to indicate the moment at which the temperature drop below the level where a satisfactory moistening effect can no longer be assured. This method has considerable advantages compared to the experiment for guaranteeing an adequate adhesive connection where the materials to be connected are coated on the adhesive-free side with a thermochrome dye. The problems of unsatisfactory thermal conduction as well as the temperature of the other material to be connected by the adhesive in no way guarantees that the temperature required for satisfactory moistening is maintained in the thermoplastic material when such a technique is used.

It is advantageous in using the method of the present invention to utilize a thermoplastic adhesive where the change in color takes place in a temperature range above the minimum temperature for satisfactory moistening, particularly in a range up to approximately 20° C. above the minimum temperature for satisfactory moistening. By moistening temperatures are meant those temperatures at which the thermoplastic adhesive has a viscosity which affords a satisfactory moistening of the materials to be glued or sealed. Undoubtedly, the viscosity of the thermoplastic adhesive is decisive. Due to the relationship in the laws of nature between viscosity and temperature and the difficulty of providing a visual indication of viscosity, the present invention is based not on an indication of the required minimum viscosity as the measuring parameter, but by using the corresponding temperature and by indicating the presence or absence of the temperature by the change occurring due to the use of thermochrome dyes. The change in color preferred according to the invention is in the range just above the minimum temperature for moistening, because when the thermoplastic adhesive leaves the melting gun it usually has a higher temperature with an approximation to the minimum temperature range for moistening taking place at the adhesive connection or sealing location. The use of a change in color in the lower temperature region of the minimum temperature zone for moistening or in the temperature range which falls immediately below that zone which gives an indication that satisfactory moistening is no longer assured, is by no means excluded from the scope of the invention.

In accordance with the present invention, the use of those thermoplastic adhesives is preferred which contain thermochrome dies having, at those temperatures at which satisfactory moistening is assured, signal colors, and which provide a change in color when the temperature falls below a level at which satisfactory moistening is no longer guaranteed.

Generally, the viscosities of thermoplastic adhesives which assure satisfactory moistening and surface adhesion are at temperatures at or above approximately 100° C., preferably above approximately 120° C. and particularly in the temperature range of approximately 120° to 180° C. Accordingly, it is preferable to use thermoplastic adhesives containing a thermochrome dye which provides a change in color in the temperature range of approximately 100° to 180° C. and preferably in the range of approximately 120° to 140° C. There are, however, thermoplastic adhesives in which the viscosities which guarantee a satisfactory moistening are attained only in the temperature range of approximately 200° C.

dye which have two color change points, that is, one color change point in the minimum temperature range for satisfactory moistening and another color change point in the temperature range where the decomposition of the thermoplastic adhesive commences. The temperatures at which the plastic materials, on which the thermoplastic adhesive material is based, show noticeable decomposition or at which such decomposition commences, are known to the manufacturer and can be easily established. Frequently, such temperatures are in the range above approximately 200° C., usually in the range of approximately 220° to 240° C. It is definitely possible, however, that higher temperatures may occur and are known. For example, the decomposition of thermoplastic polyamide resins starts in the range of approximately 300° C.

The known thermoplastic adhesives are based on polyethylene, polypropylene, polyisoprene, polybutene, polyamide, vinyl polymers and vinyl copolymers such as ethylvinylacetates, thermoplastic polyesters, polyurethanes and the like may be used as thermoplastic adhesives. The following list of compounds is useful as thermochrome dyes which evidence a change in color in the desired temperature range:

Inorganic Thermochrome Dyes for instance:

| Compound | Color | Transition | Color | Transition | Color |
|---|---|---|---|---|---|
| $HgI_2$ | red | ⇌ 128° C. | yellow | | |
| $NiNH_4PO_4 \cdot 6H_2O$ | light gray | ⇌ 120° C. | gray | | |
| $NH_4VO_3$ | white | ⇌ 150° C. | brown | 170° | black |
| $[Co(NH_3)_6]PO_4$ | yellow | ⇌ 200° C. | blue | | |
| $(NH_4)_2U_2O_7$ | yellow | ⇌ 200° C. | gray | | |
| $CoNH_4PO_4 \cdot H_2O$ | purple red | ⇌ 140° C. | deep blue | | |
| Tin dithiole | scarlet red | ⇌ 100° C. | purple red | ⇌ 200° C. | dark purple to black |

Organic Thermochrome Dyes

For instance:
3-diethylamino-6-methyl-7-chlorfluoran (1 part by weight)

bisphenol A (5 parts by weight)     red ⇌ 150° C. colorless crystal violet lactone (1 part by weight) + bisphenol A
(1 part by weight)     green ⇌ 102° C. yellow Thermoplastic adhesives in this category are based on thermoplastic polyamide resins.

Further, in accordance with the present invention a thermoplastic adhesive is used with a thermochrome dye, or possibly an additional thermochrome dye, which affords a change in color in the temperature region where there is a noticeable decomposition of the thermoplastic adhesive. While this may require an additional thermochrome dye, it is within the scope of the present invention preferable to employ thermochrome Generally, thermoplastic adhesives are used which contain thermochrome dyes in amounts in the range 0.05 to 5 weight %, particularly the range of 0.1 to 0.5 weight %, relative to the total thermoplastic adhesive weight.

The subject matter of the present invention also includes thermoplastic adhesives for carrying out the above-described method which contain at least one thermochrome dye in the range of 0.05 to 5 weight % compared to the total adhesive material weight, with the thermochrome dye providing a change in color within the temperature range between the temperatures required for a satisfactory moistening effect and the temperature where such effect is no longer assured. Moreover, the invention includes thermoplastic adhesives containing a possibly additional thermochrome dye which provides a change in color at the temperature where a noticeable decomposition of the thermoplastic occurs.

Usually, the temperature required for satisfactory moistening is at or above approximately 100° C., preferably above approximately 120° C., and particularly between approximately 120° and 180° C.

The following examples serve to explain the invention:

EXAMPLE 1

| EVA Adhesive | |
| --- | --- |
| ethylene vinyl acetate copolymer (vinyl acetate proportion 30%) | 60 parts |
| vinyl toluene-acrylic acid ester | 10 parts |
| pentaerythritol resin | 10 parts |
| calcite | 18 parts |
| titanium dioxide | 1 part |
| $NH_4VO_3$ | 1 part |
| | 100 parts |

Processing temperature exceeding 150° C., exceeding 170° C. black

EXAMPLE 2

| PA-Adhesive | |
| --- | --- |
| thermoplastic polyamide resin | 70 parts |
| maleic resin | 10 parts |
| pyrogen silicic acid | 1 part |
| EVAC (vinyl acetate proportion > 30%) | 17 parts |
| $[Co(NH_3)_6]PO_4$ | 2 parts |
| | 100 parts |

That the yellow adhesive is best processed at a temperature >200° C. is indicated by its blue color because change in color takes place at 200° C.

This adhesive is best used where the desired temperature change is in the range of 200° C. since the change in color from yellow to blue takes place at 200° C.

While specific embodiments of the invention have been shown and described in detail to illustrate the application of the inventive principles, it will be understood that the invention may be embodied otherwise without departing from such principles.

I claim:

1. A method of making adhesive connections or seals using a thermoplastic adhesive where the thermoplastic adhesive remains at or above the minimum temperature required for satisfactory moistening the materials to be glued or sealed and indicating when the temperature of the thermoplastic material falls below the minimum temperature required for satisfactory moistening comprising the steps of using a solid thermoplastic adhesive containing at least one thermochrome dye showing a color change in the temperature range between the minimum temperature necessary for satisfactory moistening of the materials to be glued or sealed by the thermoplastic adhesive and a temperature approximately 20° above the minimum temperature at which a satisfactory moistening occurs, and heating the solid thermoplastic adhesive into a molten state where the molten thermoplastic is sufficiently viscous and is heated to a temperature at least approximately 20° above the minimum temperature necessary for satisfactory moistening and noting any color change in the thermoplastic adhesive indicating that the thermoplastic adhesive is approaching the minimum temperature necessary for satisfactory moistening.

2. A method, as set forth in claim 1, including the step of using a thermochrome dye in the thermoplastic adhesive which dye shows a change in color at the temperature where the thermoplastic adhesive commences a noticeable decomposition.

3. A method, as set forth in claim 2, wherein the temperature for effecting satisfactory moistening occurs in the range of 100° C. to 150° C.

4. A method, as set forth in claim 3, wherein the temperature for affording satisfactory moistening is at approximately 120° C.

5. A method, as set forth in claim 2, wherein the temperature for affording satisfactory moistening is in the range of approximately 120° to 180° C.

6. A thermoplastic adhesive for providing a gluing or sealing action including a thermoplastic adhesive material in the solid state below the minimum temperature at which the thermoplastic adhesive material ceases to have a satisfactory moistening effect at least one thermochrome dye having a weight in the range of 0.05 to 5 weight % of the total weight of the thermoplastic adhesive, said thermochrome dye changing color in the temperature range between the temperature at which the thermoplastic adhesive material ceases to have a satisfactory moistening effect and a temperature approximately 20° C. above the minimum temperature at which the thermoplastic adhesive material ceases to have a satisfactory moistening effect.

7. A thermoplastic adhesive, as set forth in claim 6, wherein the thermoplastic adhesive includes a thermochrome dye which affords a change in color at the temperature at which the thermoplastic adhesive commences noticeable decomposition.

8. A thermoplastic adhesive, as set forth in claim 5 or 6, wherein the temperature required for satisfactory moistening occurs in the range of 100° C. to 150° C.

9. A thermoplastic adhesive, as set forth in claim 8, wherein the temperature required for satisfactory moistening is above approximately 120° C.

10. A thermoplastic adhesive, as set forth in claim 5 or 6, wherein the temperature required for satisfactory moistening is in the range of approximately 120° to 180° C.

* * * * *